United States Patent
Zanzig et al.

(10) Patent No.: US 6,465,560 B1
(45) Date of Patent: Oct. 15, 2002

(54) TIRE WITH TREAD OF SPATIALLY DEFINED ELASTOMER COMPOSITION

(75) Inventors: David John Zanzig, Uniontown, OH (US); Aaron Scott Puhala, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/503,371

(22) Filed: Feb. 14, 2000

(51) Int. Cl.⁷ .................................................. C08K 3/04
(52) U.S. Cl. ........................ 524/495; 524/496; 524/515; 524/237; 525/333.3
(58) Field of Search ................................ 524/237, 495, 524/496, 515; 525/333.3

(56) References Cited

U.S. PATENT DOCUMENTS

| | | | |
|---|---|---|---|
| 5,504,140 A | 4/1996 | Zanzig et al. | 524/526 |
| 5,616,639 A | 4/1997 | Lucas | 524/262 |
| 5,723,530 A | 3/1998 | Zanzig et al. | 524/495 |

FOREIGN PATENT DOCUMENTS

| | | | |
|---|---|---|---|
| EP | 0831122 | 3/1998 | C08L/9/00 |
| EP | 0905185 | 3/1999 | C08L/9/00 |
| EP | 0934973 | 8/1999 | C08L/7/00 |

OTHER PUBLICATIONS

Abstract XP–002070580; JP07292162 as published in "Derwent Publications Ltd.", London, Great Britain, Section Ch Week 1996–2; Nov. 7, 1995.

European Search Report.

*Primary Examiner*—Peter D. Mulcahy
(74) *Attorney, Agent, or Firm*—Henry C. Young, Jr.

(57) ABSTRACT

Pneumatic rubber tire with an outer, circumferential tread comprised of a cis 1,4-polybutadiene-rich and silica-rich rubber composition which contains specified elastomers with spatially defined glass transition temperatures, in conjunction with silica and specified carbon black reinforcement.

13 Claims, 2 Drawing Sheets

TIRE WITH TREAD OF SPATIALLY DEFINED ELASTOMER COMPOSITION

FIELD

Figure 1:
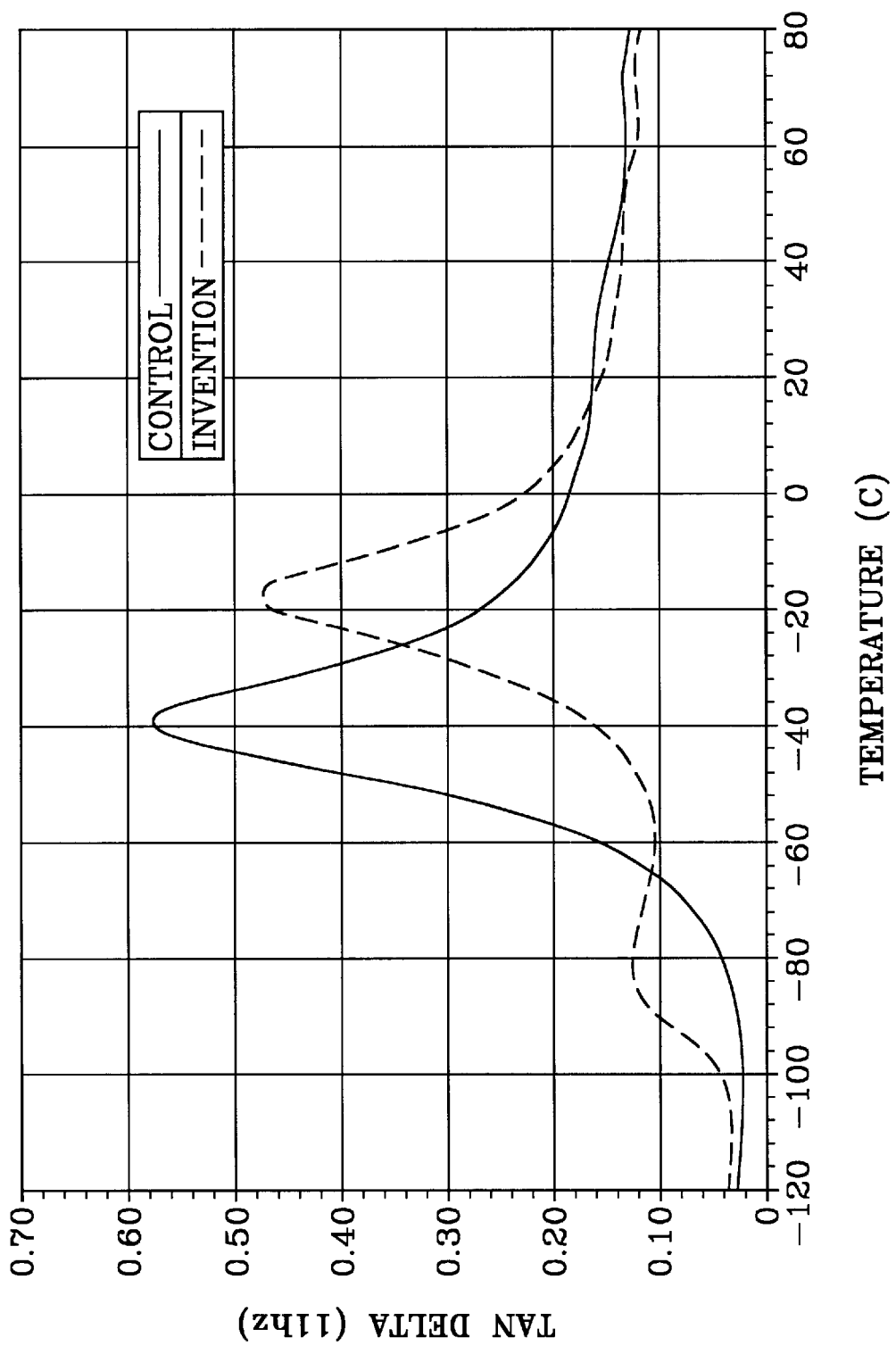

Pneumatic rubber tire with an outer, circumferential tread comprised of a cis 1,4-polybutadiene-rich and silica-rich rubber composition which contains specified elastomers with spatially defined glass transition temperatures, in conjunction with silica and specified carbon black reinforcement.

BACKGROUND OF THE INVENTION

Pneumatic rubber tires, particularly high performance tires, are desired to have treads of a rubber composition which will provide good traction on the road.

Resistance to treadwear of such tires is often sacrificed in order to achieve such good traction.

Indeed rubber compositions designed to specifically emphasize very good traction for a tire tread often have relatively low abrasion resistance and associated relatively poor treadwear and typically exhibit a relatively high, single, glass transition temperature (Tg) of above −50° C. and usually within a range of about zero to about −50° C.

Conversely, rubber compositions designed to specifically emphasize very good resistance to abrasion for a tire tread often have relatively poor traction and also typically exhibit a single low Tg below −50° C.

Therefore, a tread rubber composition exhibiting a balance between traction and treadwear is difficult to achieve where the rubber composition exhibits only a single Tg.

In U.S. Pat. No. 5,723,530, a tire is presented with a tread where good traction is desired yet still having an acceptable treadwear.

In U.S. Pat. No. 5,723,530, a tire is provided with a tread which is composed of four elastomers, of which two of the elastomers are spatially defined, namely, (1) 25 to 60 phr of styrene/butadiene rubber with Tg in a range of −15° C. to −45° C.; (2) 5 to 40 phr of medium vinyl polybutadiene rubber with vinyl content of 40 to 65 and a Tg in a range of −45° C. to −65° C.; (3) 20 to 40 phr of cis 1,4-polybutadiene rubber with a Tg in a range of −95° C. to −105° C.; and (4) 5 to 30 phr of cis 1,4-polyisoprene rubber having a Tg in a range of −65° C. to −70° C.; wherein the Tg of the cis 1,4-polybutadiene rubber is at least 50° C. lower than the Tg of the styrene/butadiene rubber. A specified carbon black is also specified. It is readily seen in this patent disclosure that a tire tread rubber composition is provided which exhibits dual Tgs but is comprised of carbon black as reinforcement and less than 45 phr of cis 1,4-polybutadiene.

In the description of this invention, terms such as "compounded rubber", "rubber compound" and "compound", if used herein, refer to rubber compositions composed of one or more elastomers blended with various ingredients, including curatives such as sulfur and cure accelerators. The terms "elastomer" and "rubber" might be used herein interchangeably. It is believed that all of such terms are well known to those having skill in such art.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined by a differential scanning calorimeter (DSC) at a temperature rate of increase of 10° C. per minute.

The existence of more than one glass transition temperature of a cured rubber composition can be determined by dynamic mechanical testing and demonstrated, for example, as a graphical representation, or plot, of tangent delta, or of loss modulus (i.e. E") as a function of temperature. The existence of more than one glass transition temperature for the rubber composition is evident when at least two humps, or peaks, are present in the plot between the temperatures of −90° C. and 10° C.

DISCLOSURE AND PRACTICE OF THE INVENTION

In accordance with this invention, a pneumatic rubber tire is provided having a circumferential rubber tread where said tread is a rubber composition comprised of, based on 100 parts by weight of the tread rubber, (A) conjugated diene-based elastomers comprised of
  (1) at least 45 to about 85, alternatively at least 50 to about 85, or even from a threshold of at least 55 to about 85, phr of cis 1,4-polybutadiene rubber having a Tg within a range of about −956° C. to about −105° C.;
  (2) about 15 to about 55, alternatively about 15 to about 50, phr of at least one elastomeric styrene/butadiene copolymer rubber having a bound styrene content in a range of about 30 to about 55 percent selected from one of
    (i) emulsion polymerization prepared styrene/butadiene copolymer having a Tg within a range of −15° C. to −45° C.; or
    (ii) organic solution polymerization prepared tin coupled styrene/butadiene copolymer having a Tg within a range of −55° C. to −25° C.;
  (3) about 0 to about 15, alternatively about 5 to about 15 phr of a medium vinyl polybutadiene having a vinyl content in a range of about 45 to about 70 and a Tg in a range of about −55° C. to about −35° C.;
  wherein the Tg of the cis 1,4-polybutadiene Tg elastomer is at least 50° C. lower than the Tg of the styrene/butadiene elastomer; and
  (4) about zero to about 15, alternatively about 5 to about 15, phr of cis 1,4-polyisoprene having a Tg in a range of about −65° C. to about −70° C.
(B) about 60 to about 110, alternatively about 60 to about 90, phr of reinforcing filler comprised of amorphous silica which alternately includes a high structure carbon black reinforcing filler characterized by having an Iodine adsorption value in a range of about 116 to about 135, g/kg together with a DBP number in a range of about 125.to about 140, cm$^3$/100 g; wherein the weight ratio of said silica to said carbon black is at least 1/1, alternatively at least 5/1 and alternatively in a range of about 1/1 to 20/1 whereas in one aspect, such filler is composed entirely of silica; and
(C) a coupling agent having a moiety (e.g.: a silane moiety) reactive with hydroxyl groups (e.g.: silanol groups) contained on the surface of said silica and another moiety interactive with at least one of said diene-based elastomers; wherein said coupling agent is preferably an organosilane polysulfide and more preferably a bis (trialkoxysilylalkyl) polysulfide.

It is an important aspect of this invention that the tread rubber composition is both cis 1,4-polybutadiene rubber-rich and, also silica-rich, together with an organosilane polysulfide coupling agent.

Another important aspect of the invention is a requirement that at least two elastomer phases are present in the tread rubber composition as being generated by a requirement that the combination of cis 1,4-polybutadiene and styrene/butadiene elastomers are in the clear majority insofar as elastomers in the tread rubber are concerned and, moreover, that the Tg of the cis 1,4-polybutadiene rubber is at least 50° C. lower than the Tg of the styrene/butadiene copolymer rubber.

More specifically, it is required that at least 45, preferably at least 50, and even up to a threshold of at least 55, weight percent of the elastomers have a Tg lower than −95° C., namely the cis 1,4-polybutadiene, and at least 15 weight percent of the elastomers have a Tg of higher than −55° C., namely the styrene/butadiene copolymer.

In this manner, it is considered herein that the relatively low Tg cis 1,4-polybutadiene elastomer is relatively incompatible with the high Tg styrene/butadiene copolymer elastomer as evidenced by their individual Tan. delta peaks on a graphical presentation, or plot, of Tan. delta versus temperature cured of the rubber composition within a temperature range of about −90° C. to about 10° C.

Accordingly, the elastomers of said tread rubber are present in at least two phases, comprised of a cis 1,4 polybutadiene phase and an additional phase comprised of said styrene/butadiene and/or tin coupled styrene/butadiene phase.

In particular, and as one aspect of this invention, a graphical plot of Tan. delta versus temperature curve within a broad range of −100° C. to 10° C. for the rubber composition of this invention yields two peaks in the curve with one peak having its apex within a relatively low temperature range of −100° C. to −50° C. and a second peak with its apex within a higher temperature range of −30° C. to +10° C.

Thus, evidence of the elastomer incompatibilities is the presence of the dual Tan. delta peaks for the sulfur cured elastomer composition. The Tan. delta values, with the included peaks in their curves, can be determined by dynamic mechanical testing of the cured compound by procedures well known to those skilled in such art.

Thus, it is required that the cured compounded rubber composition exhibit at least two Tan. delta peaks within the aforesaid temperature range. This is considered significant because, for the cured compounded rubber, it is considered herein that a combination of the Tan. delta peak, at the lower temperature (e.g. −100° C. to −50° C.) for the low Tg elastomer (e.g. cis 1,4-polybutadiene), would suggest a promotion of improved resistance to abrasion property (i.e. improved treadwear for a tire) together with the second Tan. delta peak, at the higher temperature (e.g. −30° C. to 10° C.) represented by the high Tg elastomer (e.g. the SBR), would suggest a promotion of higher hysteresis at temperatures within a range of about −30 to about 0° C. (i.e. higher tire tread traction), all of which is predictive of a better balance of such abrasion resistance and traction properties, particularly for a tire tread, than a cured rubber composition exhibiting only a single Tan. delta peak within the aforesaid temperature range of −90° C. to 10° C.

In practice, the relatively high styrene-containing, emulsion. polymerization prepared, styrene/butadiene copolymer elastomer and tin coupled organic solvent solution polymerization prepared styrene/butadiene copolymer elastomer are considered herein to be important to enhance tire tread traction, hysteresis, or coefficient of friction, for the rubber composition. It is desired herein that their bound styrene content be at least 30 percent, based upon the SBR, for the tire tread traction enhancement.

Use of the organic solvent polymerization prepared tin coupled styrene/butadiene copolymer is considered herein to be important in order to enhance processability of the rubber composition and to promote better resistance to abrasion of the rubber composition. Also, use of tin coupled SBR promotes lower hysteresis of the rubber composition at very high tire tread operating temperatures (e.g. 50° C. to 100° C.) which is indicative of low tire rolling resistance.

Tin coupled copolymer may be prepared, for example, by introducing a tin coupling agent during the styrene-1,3-butadiene copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomered are bonded to butadiene units. of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well know to those having skill in such art.

Various tin compounds, particularly organo tin compounds, may be used for the coupling of the elastomer. Representative of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example, in U.S. Pat. No. 5,064,901.

In the practice of this invention, use of a quantitative amount of at least 45, and preferably at least 55, phr of the high cis 1,4-polybutadiene elastomer in the rubber composition of this invention is considered herein to be important in order to enhance resistance to abrasion for the tire tread.

Use of the cis 1,4-polyisoprene, preferably natural rubber, is considered herein to be important in order to enhance processability of the tire tread rubber composition with a relatively minimum amount of processing oil and processing additives which are considered herein to normally adversely offset abrasion resistance.

The addition of the cis 1,4-polyisoprene natural rubber is also considered herein to be important to contribute to tear resistance property for the tread rubber composition.

Use of rubber reinforcing carbon black(s) for this invention, with the characterized Iodine adsorption value range and DBP number range, is considered herein to be important in order to provide good abrasion resistance, or coefficient of friction, and higher stiffness for the tire cornering and handling, and also enhanced, or relatively high hysteresis for relatively good traction for a tire tread.

Representative of such rubber reinforcing carbon blacks are, for example, N121 and N205. All of such representative carbon blacks have an Iodine adsorption number within a range of about 110 to about 145 g/kg and a DBP number in a range of about 110 to about 140 $cm^3$/g. Examples of reinforcing carbon blacks for elastomers, generally, together with their Iodine number values and DBP (dibutyl phthalate) absorption values, may be found in The Vanderbilt Rubber Handbook, (1990), 13th edition, pages 416–419.

In the practice of this invention, use of the specific combinations of the aforesaid silica-rich, multiphase elastomer blend and coupling agent are considered herein to be important in order to optimize resistance to abrasion (treadwear) and to provide a suitable hysteresis (i.e. traction).

In practice, it is preferred that the elastomers utilized in the tread composition are exclusive of polymers and copolymers of isobutylene, including halogen modifications thereof.

As hereinbefore pointed. out, the invention is based upon use of elastomers, silica and coupling agent, all of which are usually known, in what is considered herein as a novel combination as to (i) selection of specific individual materials, and (ii) combining the selected specific materials in novel combinations in terms of individual amounts in a manner not believed to be specifically heretofore used for a tire tread. This aspect of the invention is considered particularly important for creating a tire tread rubber composition with good abrasion properties coupled, also, with good traction, or coefficient of friction, or hysteresis, properties. This aspect of the invention is especially directed to its more narrowly defined aspects which is restated, in its narrower form as follows:

The tread rubber composition is required to be both cis-polybutadiene-rich and silica-rich, together with a coupling agent. In particular, it is desires that the filler reinforcement for the rubber composition be primarily, and for some circumstances entirely, amorphous, silica, particularly precipitated silica.

The commonly employed siliceous pigments used in rubber compounding applications are usually amorphous siliceous pigments (referred to herein as silica), preferably a precipitated silica, although the silica may be a pyrogenic silica.

The precipitated silicas such as, for example, those obtained by the acidification of a soluble silicate, e.g., sodium silicate or a co-precipitation of a silicate and an aluminate.

The BET surface area of the silica, as measured using nitrogen gas, may, for example, be in a range of about 50 to about 300, alternatively about 120 to about 200, square meters per gram. A BET method of measuring surface area is described in the *Journal of the American Chemical Society*, Volume 60, Page 304 (1930).

The silica may also have a dibutylphthalate (DBP) absorption value in a range of about 100 to about 400, and usually about 150 to about 300.

Various commercially available silicas may be considered for use in this 30 invention such as, for example, only and without limitation, silicas commercially available from PPG Industries under the Hi-Sil trademark with designations 210, 243, etc. silicas available from Rhobia, with designations of Zeosil 1165MP and Zeosil 165GR and silicas available from Degussa AG with designations VN2 and VN3, 3770GR, and from Huber as Zeopol 8745.

When silica reinforcement is used for a rubber tire tread, the silica is conventionally used with a coupling agent, or what is sometimes referred to as a reinforcing agent Compounds capable of reacting with both the silica surface and the rubber elastomer molecule in a manner to cause the silica to have a reinforcing effect on the rubber, many of which are generally known to those skilled in such art as coupling agents, or couplers, are often used. Such coupling agents, for example, may be premixed, or pre-reacted, with the silica particles or added to the rubber mix during the rubber/silica processing, or mixing, stage. If the coupling agent and silica are added separately to the rubber mix during the rubber/ silica mixing, or processing stage, it is considered that the coupling agent then combines in situ with the silica.

In particular, such coupling agents may, for example, be composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler acts as a connecting bridge between the silica and the rubber and thereby enhances the rubber reinforcement aspect of the silica.

In one aspect, the silane of the coupling agent apparently forms a bond to the silica surface, possibly through hydrolysis, and the rubber reactive component of the coupling agent combines with the rubber itself.

Numerous coupling agents are taught for use in combining silica and rubber such as, for example, silane coupling agents containing a polysulfide component, or structure, such as bis-(3-alkoxysilylalky) polysulfide which contains from 2 to 6 sulfur atoms in its polysulfidic bridge with an average of from 2 to 2.6 or from 3.5 to about 4, preferably an average of from 2 to 2.6, connecting sulfur atoms in its polysulfidic bridge such as, for example, a bis-(3-triethoxysilylpropyl) polysulfide.

A preferred coupling agent is a bis-(3-ethoxysilylpropyl) disulfide material having from 2 to 4, with an average of from 2 to 2.4, connecting sulfur atoms in the polysulfide bridge. Such disulfide-type coupling agent is particularly preferred in order to provide enhanced ease of processing, particularly mixing, the unvulcanized rubber composition.

It is readily understood by those having skill in the art that the rubber compositions of the tread would be compounded with conventional compounding ingredients including the aforesaid reinforcing fillers such as carbon black and precipitated silica, as hereinbefore defined, in combination with a silica coupling agent, as well as antidegradant(s), processing oil as hereinbefore defined, stearic acid or a zinc stearate, zinc oxide, sulfur-contributing material(s) and vulcanization accelerator(s) as hereinbefore defined.

Such compounding of rubber is well known to those having skill in such art. Antidegradants are typically of the amine or phenolic type. While stearic acid is typically referred to as a rubber compounding ingredient, it may be pointed out that the ingredient itself is usually obtained and used as a mixture of organic acids primarily composed of stearic acid with at least one of oleic acid, linolenic acid and/or palmitic acid normally contained in the stearic acid as typically used. The mixture may contain minor amounts (less than about six weight percent) of myristic acid, arachidic acid and/or arachidonic acid. Such material or mixture is conventionally referred to in the rubber compounding art as stearic acid.

Where normal or typical rubber compounding amounts or ranges of amounts of such additives are used, they are not otherwise considered as a part of the invention. For example, some of the ingredients might be classified, in one aspect, as processing aids. Such processing aids may be, for example, waxes such as microcrystalline and paraffinic waxes typically used in a range of about 1 to 5 phr and often in a range of about 1 to about 3 phr; and resins, usually as tackifiers, such as, for example, synthetic hydrocarbon and natural resins typically used in a range of about 1 to 5 phr and often in a range of about 1 to about 3 phr. A curative might be classified as a combination of sulfur and sulfur cure accelerator(s) for the rubber compound (usually simply referred to as accelerator) or a sulfur don or/accelerator. In a sulfur and accelerator(s) curative, the amount of sulfur used is in a range of about 0.5 to about 5 phr and usually in a range of about 0.5 to about 3 phr; and the accelerator(s), often of the sulfenamide type, is (are) used in a range of about 0.5 to about 5 phr and often in a range of about 1 to about 2 phr.

The ingredients, including the elastomers but exclusive of sulfur and accelerator curatives, are normally first mixed together in a series of at least two sequential mixing stages, although sometimes one mixing stage might be used, to a temperature in a range of about 145° C. to about 185° C., and such mixing stages are typically referred to as non-productive mixing stages. Thereafter, the sulfur and accelerators, and possibly one or more retarders and one or more antidegradants, are mixed therewith to a temperature of 5 about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art. In such case of retreading of a tire, the tire tread might first be precured and then applied to the already cured tire carcass with a curable gum strip between the tread and carcass and the assembly then submitted to curing conditions to cure the aforesaid gum strip.

The invention may be better understood by reference to the following example in which the parts and percentages are by weight unless otherwise indicated.

EXAMPLE I

Rubber compositions comprised of cis 1,4-polybutadiene rubber and SBR(s), including a coupling agent, were prepared.

In particular, mixtures of diene rubber compositions were prepared comprised of recipes shown in Table 1 as Samples A through F, with Samples A, B and C being in a nature of Controls and the remaining Samples D through F representing various aspects of the invention and illustrated in the following Table 1.

All of the Samples utilize cis 1,4-polybutadiene rubber together with various typical rubber compounding ingredients.

For comparison purposes, all of the compositions were prepared with compounds of equal styrene content.

Control Samples A, B and C utilized a blend of compatible elastomers consisting of high cis 1,4-polybutadiene rubber and emulsion polymerization prepared styrene/butadiene elastomer which contained 23.5 percent bound styrene.

Samples D, E and F are test rubber compositions representative of the invention and contain incompatible elastomers consisting of high cis 1,4-polybutadiene rubber and emulsion polymerization prepared styrene/butadiene elastomer which contained 40 percent bound styrene.

For reinforcing fillers, Control Sample A used a specified silica and Control Samples B and C used a combination of carbon black and silica.

For reinforcing fillers, invention Sample D used the specified silica, invention Samples E and F used a combination of carbon black and silica as used in the Control Samples.

TABLE I

| Material | Sample A Control | Sample B Control | Sample C Control | Sample D | Sample E | Sample F |
|---|---|---|---|---|---|---|
| Non-productive mixing | | | | | | |
| Cis 1,4-polybutadiene Elastomer[1] | 30 | 30 | 30 | 59 | 59 | 59 |
| E-SBR[2] (23.5% BS) | 70 | 70 | 70 | 0 | 0 | 0 |
| E-SBR[3] (40% BS) | 0 | 0 | 0 | 41 | 41 | 41 |
| Carbon Black[4], N205 | 0 | 10 | 20 | 0 | 10 | 20 |
| Silica[5] | 70 | 70 | 70 | 70 | 70 | 70 |
| Silica coupler[6] | 11.2 | 11.2 | 11.2 | 11.2 | 11.2 | 11.2 |
| Aromatic oil[7] | 43.8 | 43.8 | 43.8 | 43.8 | 43.8 | 43.8 |
| Wax[8] | 3.5 | 3.5 | 3.5 | 3.5 | 3.5 | 3.5 |
| Stearic acid | 2 | 2 | 2 | 2 | 2 | 2 |
| Zinc oxide | 5 | 5 | 5 | 5 | 5 | 5 |
| Productive mixing | 1.5 | 1.5 | 1.5 | 1.5 | 1.5 | 1.5 |
| Sulfur | | | | | | |
| Accelerator[9] | 3.5 | 3.5 | 3.5 | 3.5 | 3.5 | 3.5 |

[1]A cis 1,4-polybutadiene elastomer, reported above on a dry weight basis, having a high cis 1,4-content of at least 95 percent and having and a Tg of about −100° C. obtained as Budene ® 1254 from The Goodyear Tire & Rubber Company (oil extended with 25 phr of aromatic rubber processing oil).
[2]An emulsion polymerization prepared styrene/butadiene copolymer elastomer (E-SBR), reported above on a dry weight basis, having a styrene content of about 23.5 percent and a Tg of about −52° C. obtained from The Goodyear Tire & Rubber Company (oil extended with 37.5 phr of aromatic rubber processing oil).
[3]Emulsion polymerization styrene/butadiene copolymer elastomer (E-SBR), reported above on a dry weight basis, containing 40 percent bound styrene (BS) and having a Tg of about −35° C. obtained from The Goodyear Tire & Rubber Company (oil extended with 37.5 phr ofaromatic rubber processing oil).

TABLE I-continued

| Material | Sample A Control | Sample B Control | Sample C Control | Sample D | Sample E | Sample F |
|---|---|---|---|---|---|---|

[4]N205 (ASTM designation) carbon black having an Iodine number of about 122 with a DBP value of about 115.
[5]Obtained as Zeopol 8745 from the Huber Company.
[6]A 50/50 composite of carbon black and bis-(3-triethoxysilylpropyl) disulfide material from Degussa A.G. and identified as X266S.
[7]The oil includes both an added aromatic rubber processing oil as well as the oil contained in the oil extended elastomers.
[8]A mixture of microcrystalline and paraffin waxes.
[9]Accelerators as sulfenamide type and diphenylguanidine.

The prepared rubber compositions were cured at a temperature of about 160° C. for about 14 minutes and the resulting cured rubber samples evaluated for their physical properties (rounded numbers are reported herein) as shown in the following Table 2. The rubber composition Samples A through F correspond to the Samples A through F of Table 1.

TABLE 2

| Material | Sample A Control | Sample B Control | Sample C Control | Sample D | Sample E | Sample F |
|---|---|---|---|---|---|---|
| Rebound (%) at 23° C. (Zwick) | 43.7 | 38.1 | 34 | 39 | 35.1 | 31.7 |
| Ult. Elongation (%) | 699 | 660 | 608 | 678 | 621 | 593 |
| 300% Modulus, MPa | 4.8 | 5.7 | 6.9 | 5.2 | 6.5 | 7.4 |
| Tensile Strength, MPa | 19.0 | 19.2 | 18.8 | 17.6 | 17.7 | 18.0 |
| Shore A hardness (23° C.) | 56.5 | 61.5 | 65.5 | 57.6 | 61.6 | 66.5 |
| DIN abrasion | 91.3 | 100 | 93.5 | 70.7 | 75.0 | 88.0 |

DIN abrasion data (DIN No. 53516 at 2.5 Newtons) for the Samples A through F is reported in the above Table 2 as relative volume loss relative to Sample B as being a value of 100.

It can readily be seen from Table 2 that both lower rebound value and DIN abrasion volume loss is evidenced which is predictive of better traction and better resistance to abrasion for a tire tread of such rubber composition for the following test samples as compared to their comparable Control Samples:

(1) Test Sample D compared to Control Sample A.
(2) Test Sample E compared to Control Sample B.
(3) Test Sample F compared to Control Sample C.

Samples A through F were tested using a Rheometrics Sample Analyzer (II) (RSA II). The Samples were tested using a temperature sweep at 11 Hertz (Hz). The results in terms of Tan Delta versus Temperature at 11 Hz, are demonstrated in the accompanying FIG. 1.

In particular, FIG. 1 is a graph representing a plot of Tan Delta values versus Temperature for the representative Control Sample A and representative Sample D of the invention.

In FIG. 1, it can readily be seen that the curve for Control Sample A displays a single tan delta peak in the bridge region from −100° C. to 10° C. while the curve for the invention Sample displays dual tan delta peaks which are spatially spaced apart by at least 50° C., with the first peak being representative of the high cis 1,4-polybutadiene in the lower range of −90° C. to −70° C. and the second peak being representative of the emulsion polymerization SBR with 40 percent bound styrene in the higher range of 35° C. to 0° C.

EXAMPLE II

Rubber compositions of cis 1,4 polybutadiene and SBR, particularly tin coupled SBR were prepared with silica reinforcement, together with a coupling agent.

In particular, mixtures of diene rubber compositions were prepared as Samples G through L, with Samples G, H and I being in a nature of Controls and the remaining Samples J through L representing various aspects of the invention and illustrated in the following Table 3.

All of the Samples utilized cis 1,4-polybutadiene rubber together with various typical rubber compounding ingredients.

For comparison purposes, all of the compositions were prepared with compounds of equal styrene content.

Control Samples G, H and I utilized a blend of compatible elastomers consisting of high cis 1,4-polybutadiene rubber and emulsion polymerization prepared styrene/butadiene elastomer which contained 23.5 percent bound styrene.

Samples J, K and L are test rubber compositions representative of the invention and contain incompatible elastomers consisting of high cis 1,4-polybutadiene rubber and tin coupled solution polymerization prepared styrene/butadiene elastomer which contained 35 percent bound styrene.

For reinforcing fillers, Control Sample G used a specified silica, and Control Samples H and I used a combination of carbon black and silica.

For reinforcing fillers, invention Sample J used the specified silica, and invention Samples K and L used a combination of carbon black and silica as used in the corresponding Control Samples.

TABLE 3

| Material | Sample G Control | Sample H Control | Sample I Control | Sample J | Sample K | Sample L |
|---|---|---|---|---|---|---|
| Non-productive mixing | | | | | | |
| Cis 1,4-polybutadiene Elastomer[1] | 30 | 30 | 30 | 53 | 53 | 53 |
| E-SBR[2] (23.5% BS) | 70 | 70 | 70 | 0 | 0 | 0 |
| Tin coupled SBR[3] (35% BS) | 0 | 0 | 0 | 47 | 47 | 47 |
| Carbon Black[4], N205 | 0 | 10 | 20 | 0 | 10 | 20 |
| Silica[5] | 70 | 70 | 70 | 70 | 70 | 70 |
| Silica coupler[6] | 11.2 | 11.2 | 11.2 | 11.2 | 11.2 | 11.2 |
| Aromatic oil[7] | 43.8 | 43.8 | 43.8 | 43.8 | 43.8 | 43.8 |
| Wax | 3.5 | 3.5 | 3.5 | 3.5 | 3.5 | 3.5 |
| Stearic acid | 2 | 2 | 2 | 2 | 2 | 2 |
| Zinc oxide | 5 | 5 | 5 | 5 | 5 | 5 |
| Productive mixing Sulfur | 1.5 | 1.5 | 1.5 | 1.5 | 1.5 | 1.5 |
| Accelerator[9] | 3.5 | 3.5 | 3.5 | 3.5 | 3.5 | 3.5 |

[1]A cis 1,4-polybutadiene elastomer, reported above on a dry weight basis, having a high cis 1,4-content of at least 95 percent and having and a Tg of about −100° C. obtained as Budene ® 1254 from The Goodyear Tire & Rubber Company (oil extended with 25 phr of aromatic rubber processing oil).
[2]An emulsion polymerization prepared styrene/butadiene copolymer elastomer (E-SBR), reported above on a dry weight basis, having a styrene content of about 23.5 percent and a Tg of about −52° C. obtained from The Goodyear Tire & Rubber Company (oil extended with 37.5 phr of aromatic rubber processing oil).
[3]Tin coupled organic solvent solution polymerization styrene/butadiene copolymer elastomer, containing 35 percent bound styrene (BS) and having a Tg of about −51° C. obtained from JSR as T5582.
[4]An N205 (ASTM designation) carbon black having an Iodine number of about 122 with a DBP value of about 115.
[5]Obtained as Zeopol 8745 from the J. M. Huber Company.
[6]A 50/50 composite of carbon black and bis-(3-triethoxysilylpropyl) disulfide material from Degussa A.G. and identified as X266S.
[7]The oil includes an added aromatic rubber processing oil as well as the oil contained in the oil extended elastomers.
[8]A mixture of microcrystalline and paraffin waxes.
[9]Accelerators as sulfenamide type and diphenylguanidine.

The prepared rubber compositions were cured at a temperature of about 160° C. for about 14 minutes and the resulting cured rubber samples evaluated for their physical properties (rounded numbers are reported herein) as shown in the following Table 4. The rubber Samples G through L correspond to the Samples G through L of Table 3.

TABLE 4

| Material | Sample G Control | Sample H Control | Sample I Control | Sample J | Sample K | Sample L |
|---|---|---|---|---|---|---|
| Rebound (%) at 23° C. (Zwick) | 42.8 | 38.4 | 34 | 42 | 36.7 | 33.3 |
| Ult. Elongation (%) | 686 | 633 | 558 | 661 | 633 | 579 |
| 300% Modulus, MPa | 5.3 | 6.5 | 7.3 | 5.9 | 6.7 | 8.1 |
| Tensile Strength, MPa | 19.3 | 19.2 | 17.2 | 18.0 | 18.3 | 18.3 |
| Shore A hardness (23° C.) | 46.9 | 49.1 | 52.5 | 50.7 | 53.7 | 56.7 |
| DIN abrasion | 97.9 | 87.2 | 100 | 66.0 | 74.5 | 81.9 |

DIN abrasion data (DIN No. 53516 at 2.5 Newtons) for the Samples G through L is reported herein in the above Table 4 as relative volume loss relative to Sample I as being a value of 100. A lower value is better which means less rubber loss.

It can readily be seen from Table 4 that both lower rebound value and lower DIN abrasion loss is evidenced which is predictive of better traction and better resistance to abrasion for a tire tread of such rubber composition for the following test samples as compared to their comparable Control Samples:

(1) Test Sample J compared to Control Sample G.
(2) Test Sample K compared to Control Sample H.
(3) Test Sample L compared to Control Sample I.

Samples G through L were also tested using a Rheometrics Sample Analyzer (II) (RSA II). The Samples were tested using a temperature sweep at 11 Hertz (Hz). The results in terms of Tan Delta versus Temperature at 11 Hz, are demonstrated in the accompanying FIG. 2.

Figure 2:
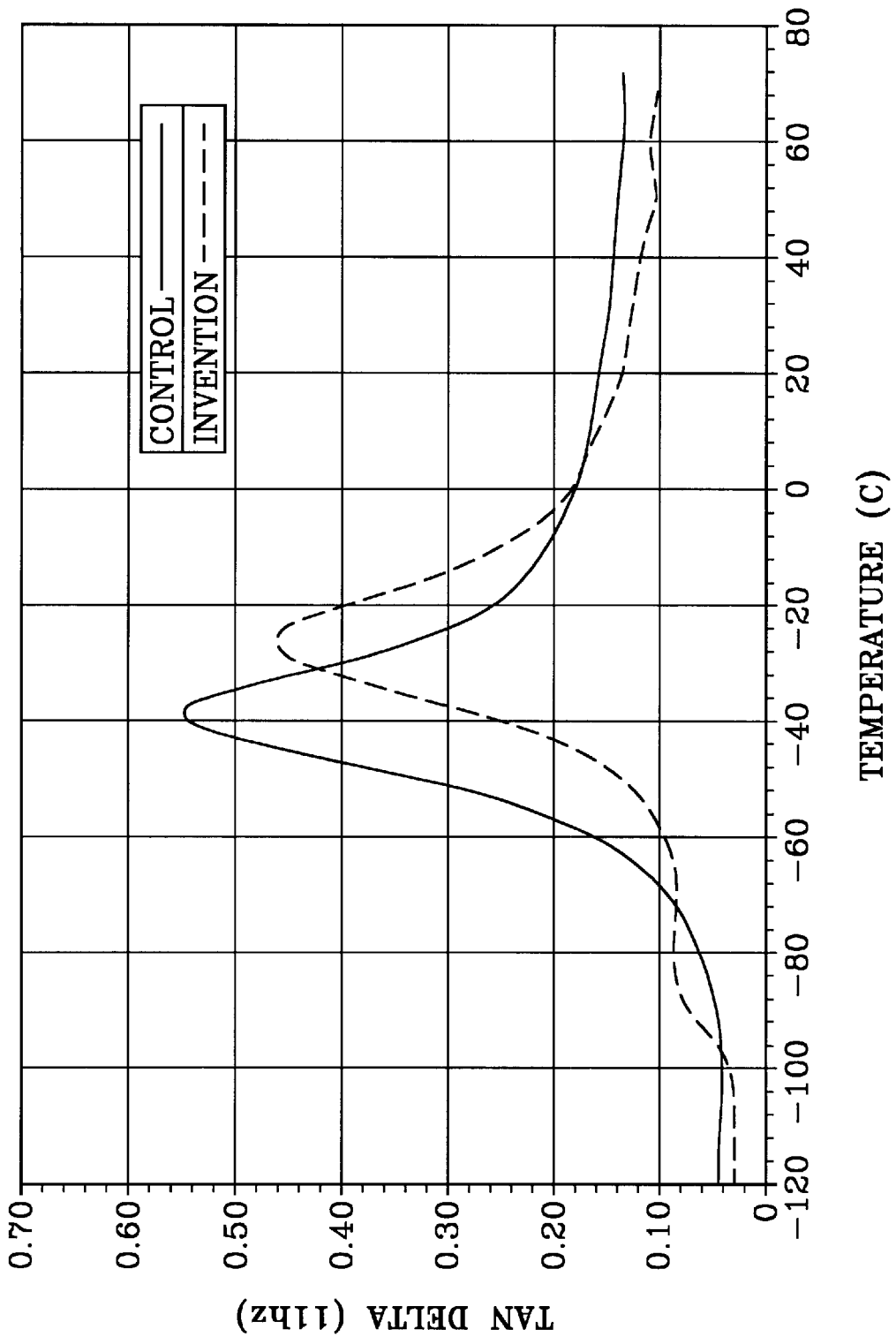

In particular, FIG. 2 is a graph representing a plot of Tan Delta values versus Temperature for the representative Control Sample G and representative Sample J of the Invention.

In FIG. 2, it can readily been seen that the curve for Control Sample G displays a single tan delta peak in the broad region from −100° C. to 10° C. while the curve for the invention Sample displays dual tan delta peaks which are spatially spaced apart by at least 50° C., the first peak being representative of the high cis 1,4-polybutadiene in the lower range of −100° C. to −70° C. and the second peak being representative of the tin coupled solution polymerization SBR with 35 percent bound styrene in the higher range of −40° C. to −10° C.

It can also be seen in FIG. 2 that Sample J of the invention exhibits a low Tan Delta at 60° C. which is indicative of improved tire rolling resistance.

While certain representative embodiments and details have been shown for the purpose of illustrating the invention, it will .be apparent to those skilled in this art that various changes and modifications may be made therein without departing from the spirit or scope of the invention.

What is claimed is:

1. A pneumatic rubber tire having a circumferential rubber tread where said tread is a rubber composition comprised of, based on 100 parts by weight of the tread rubber, (A) conjugated diene-based elastomers comprised of
  (1) from 55 to about 85 phr of cis 1,4-polybutadiene rubber having a Tg within a range of about −95° C. to about −105° C.;
  (2) from about 15 to 45 phr of at least one elastomeric styrene/butadiene copolymer rubber having a bound styrene content in a range of about 30 to about 55 percent selected from one of
    (i) emulsion polymerization prepared styrene/butadiene copolymer having a Tg within a range of −15° C. to −45° C.; or
    (ii) organic solution polymerization prepared tin coupled styrene/butadiene copolymer having a Tg within a range of −55° C. to −25° C.;
  (3) a range of from 0 to about 15 phr of a medium vinyl polybutadiene having a vinyl content in a range of about 45 to about 70 and a Tg in a range of about −55° C. to about −35° C.;
  wherein the Tg of said cis 1,4-polybutadiene elastomer is at least 50° C. lower than the Tg of the said styrene/butadiene rubber and tin coupled styrene/butadiene rubber; and
  (4) a range of from zero to about 15 phr of cis 1,4-polyisoprene rubber having a Tg in a range of about −65° C. to about −70° C.
(B) about 60 to about 110 phr of reinforcing filler comprised of amorphous silica; and
(C) a coupling agent having a moiety reactive with hydroxyl groups contained on the surface of said silica and another moiety interactive with at least one of said diene-based elastomers.

2. The tire of claim 1 wherein the rubbers are present in at least two phases, comprised of a major cis 1,4-polybutadiene phase and a minor phase comprised of said styrene/butadiene and/or tin coupled styrene/butadiene rubber phase.

3. The tire of claim 1 wherein said styrene/butadiene rubber is an aqueous emulsion polymerization prepared copolymer rubber.

4. The tire of claim 1 wherein said styrene/butadiene rubber is a tin coupled styrene/butadiene copolymer rubber prepared by organic solvent solution polymerization.

5. The tire of claim 1 wherein said coupling agent is a bis 3-(triethoxysitylpropyl) polysulfide having from 2 to 6, with an average of from 2 to 2.6 or from 3.5 to 4, connecting sulfur atoms in its polysulfidic bridge.

6. The tire of claim 1 wherein said coupling agent is a bis 3-(trethoxysilylpropyl) polysulfide having an average of from 2 to 2.6 connecting sulfur atoms in its polysulfidic bridge.

7. The tire of claim 1 wherein said cis 1,4-polybutadiene is present in an amount of at least 55 phr.

8. The tire of claim 1 wherein said filler is comprised of amorphous silica and carbon black and wherein said carbon black is a high structure carbon black reinforcing filler characterized by having an Iodine adsorption value in a range of about 116 to about 135, g/kg together with a DBP number in a range of about 125 to about 140, $cm^3/100$ g wherein the weight ratio of said silica to said carbon black is at least 1/1.

9. The tire of claim 1 wherein said medium vinyl polybutadiene is present in an amount of from 5 to 15 phr.

10. The tire of claim 1 wherein said cis 1,4-polyisoprene rubber is present in said rubber composition in an amount of from 5 to about 15 phr.

11. The tire of claim 9 wherein said coupling agent is a bis 3-(trialkoxysilylalkyl) polysulfide having from 2 to 6, with an average of from 2 to 2.6 or from 3.5 to 4, connecting sulfur atoms in its polysulfidic bridge.

12. The tire of claim 2 wherein said coupling agent is a bis 3-(triethoxysilylpropyl) polysulfide having from 2 to 6, with an average of from 2 to 2.6 or from 3.5 to 4, connecting sulfur atoms in its polysulfidic bridge.

13. The tire of claim 2 wherein said coupling agent is a bis 3-(triethoxysilylpropyl) polysulfide having an average of from 2 to 2.6 connecting sulfur atoms in its polysulfidic bridge.

* * * * *

UNITED STATES PATENT AND TRADEMARK OFFICE
CERTIFICATE OF CORRECTION

PATENT NO.   : 6,465,560 B1
DATED        : October 15, 2002
INVENTOR(S)  : David John Zanzig et al.

It is certified that error appears in the above-identified patent and that said Letters Patent is hereby corrected as shown below:

<u>Column 14,</u>
Line 16, change "3-(trethoxysilylpropyl)" to -- 3-(triethoxysilylpropyl) --.

Signed and Sealed this

First Day of July, 2003

JAMES E. ROGAN
*Director of the United States Patent and Trademark Office*